June 14, 1932.　　　　J. T. CRANE　　　　1,863,521
GASKET AND PACKING MATERIAL
Filed May 17, 1930　　2 Sheets-Sheet 1
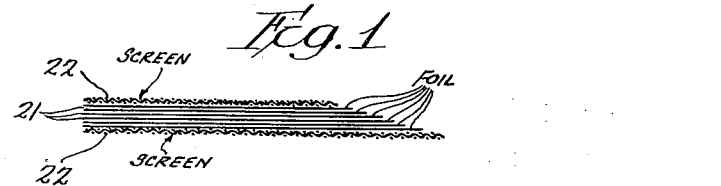
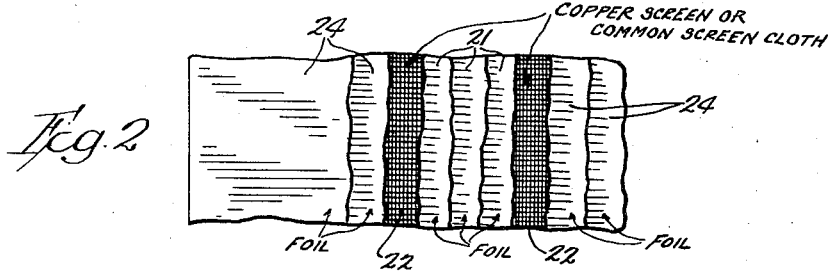
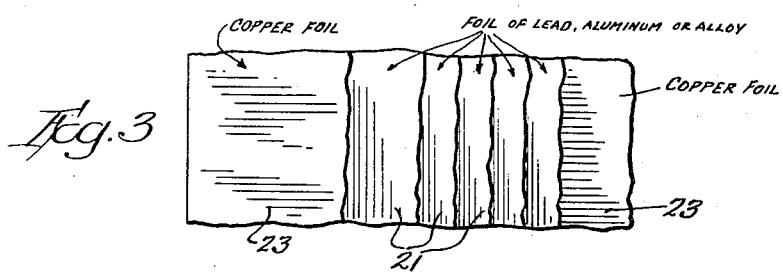
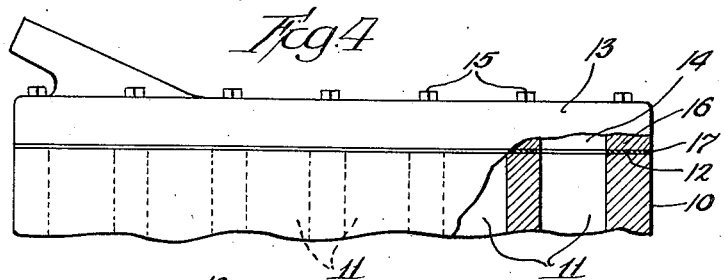
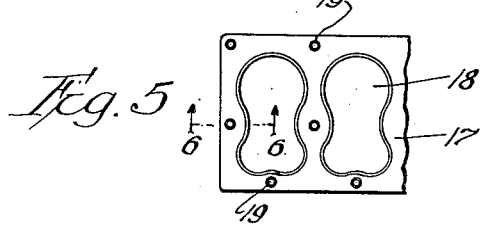
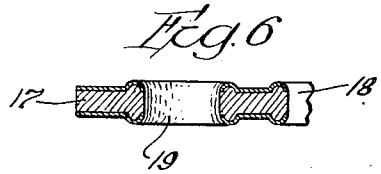
Inventor:
JOHN T. CRANE,
By E. K. Lundy
Atty.

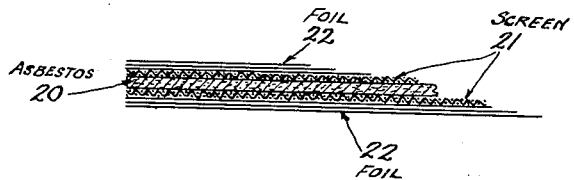
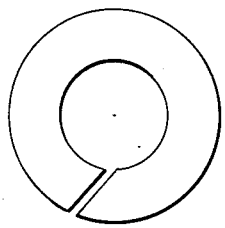 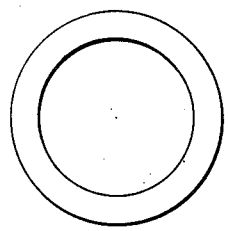
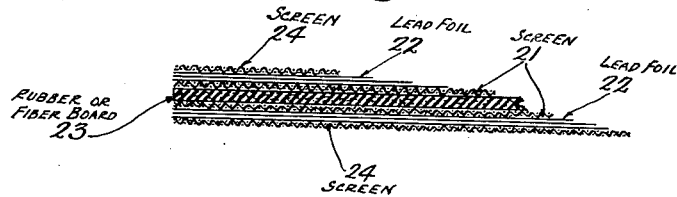

Patented June 14, 1932

1,863,521

UNITED STATES PATENT OFFICE

JOHN T. CRANE, OF MAYWOOD, ILLINOIS, ASSIGNOR TO FELT PRODUCTS MANUFACTURING CO., OF CHICAGO, ILLINOIS, A CORPORATION OF ILLINOIS

GASKET AND PACKING MATERIAL

Application filed May 17, 1930. Serial No. 453,184.

My invention relates to improvements in a gasket material to be used in the assembly of the cylinder-block and cylinder-head of internal-combustion engines such as are used in motor-vehicles, airplanes or the like, and for packing rings and similar structures. My improvements appertain to an all-metal, or fiber and metal sheet gasket or packing material that is flexible and is interposed between adjacent surfaces of a cylinder-block and head to act as a seal and prevent egress of gas, etc., or loss of compression, or it may be made in the form of packing rings. This material is to be made in sheets of continuous lengths and of different widths and it is thereafter cut or punched into gasket form or ring form of various shapes, and it may be used where high temperatures are present and may be substituted for the usual types of gaskets or rings of asbestos, rubber, and other fibrous materials.

Heretofore, so far as I am aware, it is the usual practice to employ a seal in the form of a gasket that is made from asbestos or similar substance interposed between sheets of copper or other metal, but this has been found extremely objectionable because of the fact the asbestos, or other substance with which the gasket is filled, rapidly deteriorates due to the high temperatures resulting from the explosion or ignition of the gas, the presence of oil and grease from the moving parts, or from other causes.

Due to the fact that the head is rigidly and firmly clamped down upon the cylinder-block it is possible to employ a gasket between these parts that is capable of being compressed when the bolts are screwed down to clamp the parts together, and I have therefore devised a gasket for this purpose that is fabricated from superposed sheets of metal foil such as lead, zinc, aluminum, or an alloy, and in order to cover or protect the foil I enclose the same in a top or bottom metallic covering that may be a thin copper sheet or copper-foil, or a copper or other metal gauze, which has a much higher melting or fusing point than the metallic foil. This permits the gasket material being made in sheets of suitable size which may be cut the desired shape and apertured to correspond or aline with the holes in the cylinder-block and head.

The primary object of my invention is to provide a gasket or packing ring material that is made entirely of metal, or of a sheet of fibrous substance between sheets of a particular metal, to be clamped between metal parts to provide a permanent seal or joint that is longer lived than those now available and which will at all times positively seal the joint against leakage.

I prefer to carry out my invention and to accomplish the objects thereof in substantially the manner hereinafter fully described and as more particularly pointed out in the claims, reference being made to the accompanying drawings that form a part of this specification.

In the drawings:—

Figure 1 is a diagram of an exaggerated scale showing one form of my gasket in section.

Figure 2 is a plan of a gasket made in accordance with my invention with the foil and gauze sheets broken away showing the laminations.

Figure 3 is a view similar to Figure 2 of a slightly modified arrangement.

Figure 4 is a schematic diagram of the upper portion of an automobile engine showing a portion of the block and head broken away and in section to disclose the manner of securing the parts together with the gasket interposed.

Figure 5 is a view in plan of a portion of a gasket showing the apertures therein.

Figure 6 is a transverse section on line 6—6 of Figure 5.

Figure 7 is a view similar to Figure 1 of a modified structure such as is adapted for use in making packing rings.

Figures 8 and 9 are plan views of two types of rings made from the sheet material shown in Figure 7.

Figure 10 is a view of a modified sheet material similar to that shown in Figure 7.

The drawings are understood as being more or less schematic and disclose typical embodiments of my invention, and in said drawings similar reference characters have been employed to designate like parts wherever they appear throughout the views.

Referring more particularly to Figure 4, the numeral 10 designates the cylinder-block that is provided with parallel piston-bores 11 and has a smooth upper surface 12. Mounted on the top of the block is a cylinder-head 13 that is provided with recesses 14 above the bores 11 in the block 10 in the block and which is clamped firmly and rigidly to the block by means of cap-screws or bolts 15. The head has a smooth lower surface 16 and is shaped to fit the upper surface 12 of the block and the gasket 17 is interposed between the head and block prior to screwing down the bolts 15. The gasket is of an outline corresponding with the shape of the top surface 12 of the block and is provided with apertures 18 of irregular shape, as seen in Figure 5, and it also has bolt holes 19 to permit the shanks of the bolts 15 to pass therethrough.

The gasket is made up of a plurality of sheets of flexible metal-foil 21 that form laminations and are preferably pliable, being made from metal such as lead, zinc, aluminum, copper or an alloy, and in order to protect the laminated core or body of the gasket I surround the same or place upon the top and bottom of the superposed sheets of foil cover sheets 22. These sheets may be made from sheets of wire-gauze or other metal-gauze such as illustrated in Figures 1 and 2 or they may be sheets of copper-foil 23 as shown in Figure 3.

In Figure 2 the gasket made according to the above description comprises the core made from the flexible metal-foil with the covering strips 22 of metal-gauze, and in addition thereto I place over the cover sheets one or more sheets of foil 24.

The foil comprising the core or body of the gasket is of a lower melting point or fusing point than the protective or covering sheets 22 and 23, and when the sheets are assembled in any of the modes disclosed they are compressed and the apertures and holes made therein.

The gasket is flexible and pliable, and when it is inserted between the cylinder-block and head it will compress when the bolts 15 are screwed down tightly, thus accommodating itself to any inaccuracy in the surfaces of the cylinder-block and head.

I do not limit myself to the cover or protective sheets made from a wire-gauze because the copper-foil may be substituted therefor, nor do I limit myself to the covering or protective sheets being the outmost surface of the gasket in view of the disclosure in Figure 2. The drawings and detail description herein given are for the purpose of clearness of understanding only and no limitations are to be understood therefrom.

Before the various sheets of material are assembled and pressed together a coating of a binder compound may be given several or all of the sheets to act as a filler and to maintain the gasket material in a flexible and compressible condition until it is used. When the gasket material is compressed between flanges or a cylinder block and head it will fill any unevenness, or pitting, or warping that may be present in the surfaces of the parts joined. The binder or filler may be any of the well-known commercial products accessible on the market and I prefer to mix therewith an unburnable material such as graphite, mica, etc.

In Figures 7 and 10 are shown sections of the laminated sheet material that is made in continuous lengths and any desired width and from which packing rings, such as illustrated in Figs. 8 and 9 may be stamped or punched. The material shown in Fig. 7 has a central "core" 20, preferably a sheet of fibrous material such as asbestos, upon each side of which a screen or meshed sheet 21 is placed that may be reticulated copper, aluminum or other metal, and there is an outside covering upon each side of this built-up structure that is preferably an aluminum or copper foil 22.

The different sheets may each be treated or coated with a suitable compound that acts as a filler, binder or lubricant or all depending upon the service demanded of the packing. After the laminations are completed the sheet material is compressed into a somewhat compact mass but still remains pliant and flexible, and these sheets may be carried in stock and the rings stamped, cut, or punched out of a sheet in whatever size is desired.

For the purpose of producing a packing ring sheet that is cheaper the structure may comprise the assembly shown in Fig. 10 in which the inner member 23 is a sheet of "mud" rubber, fiberboard such as strawboard, wood pulp, or other fibrous material. The screen material 21 is placed on each side of the "core" as is also the foil 22, similar to the disclosure in Figure 7, and the sheets are also coated with a compound for filling, binding or lubricating. There is also a final or exterior sheet of wire mesh 24 placed on each side of the laminated structure.

What I claim is:—

1. A gasket comprising a flat relatively thin flexible plate consisting of a plurality of sheets of metal foil, and a covering for the outer surfaces thereof formed from sheets of metal having a fusing point higher than the fusing points of said foil.

2. A gasket comprising a flat thin flexible plate consisting of a plurality of sheets of relatively soft metal foil, and a covering for the outer surfaces thereof formed from sheets of metal that are relatively harder than said foil.

3. A gasket comprising a flat thin flexible plate consisting of a plurality of sheets of metal foil, and a protective covering for said foil formed from sheets of reticulated metal.

4. A gasket comprising a flat thin flexible plate consisting of a plurality of sheets of metal foil, and a protective covering for said foil formed from sheets of wire screen compressed with the foil.

5. A gasket comprising a plurality of inner sheets of metal foil, and outer sheets of metal having a fusing point higher than the fusing point of said foil, all of said sheets being compressed into a compact relatively thin sheet and provided with a plurality of openings.

6. A gasket comprising a plurality of inner sheets of relatively soft metal foil, and outer sheets of metal that are relatively harder than said foil, all of said sheets being compressed into a compact relatively thin sheet and provided with a plurality of openings.

7. A gasket comprising a plurality of inner sheets of metal foil, and outer sheets of wire mesh, all of said sheets being compressed into a compact relatively thin sheet and provided with a plurality of openings.

8. A sheet gasket material comprising a central binder of screen-cloth, and a covering of metal-foil sheets that are softer than said screen-cloth to render the material readily compressible.

9. A flexible laminated material comprising a central sheet of fibrous material, a sheet of metal screen upon each side of said central sheet, and sheets of metal foil forming the outer layers of said laminated material, the whole structure being compressed into compact form.

10. A flexible laminated material comprising a central sheet having an asbestos base, reticulated metal sheets forming a protective covering for the faces of the central sheet, and sheets of foil outside the reticulated sheets, the whole structure being compressed to force the foil into the interstices of the protective sheets.

11. A flexible laminated packing formed in continuous sheets consisting of a central sheet of asbestos, sheets of metal screen providing protective covering for the asbestos sheet, and a plurality of sheets of metal foil and metal screen compressed upon the outer surfaces of the first-mentioned screen sheets.

12. A flexible laminated packing formed in continuous sheets consisting of a central asbestos sheet, and a protective covering therefor consisting of a plurality of sheets of metal foil that is faced upon each side with wire mesh, and the whole structure compressed into compact form.

13. A packing ring comprising an annular structure cut from a laminated sheet consisting of an asbestos sheet having protective covering upon each side that is made from superposed sheets of foil and metal screen.

Signed at Chicago, in the county of Cook and State of Illinois, this 7th day of May, 1930.

JOHN T. CRANE.